United States Patent [19]

Mason

[11] 4,266,319
[45] May 12, 1981

[54] APPARATUS FOR FACILITATING ATTACHMENT OF A BAG TO A LAWNMOWER

[76] Inventor: David R. Mason, 4162 Dearborn St., East Chicago, Ind. 46312

[21] Appl. No.: 93,860

[22] Filed: Nov. 13, 1979

[51] Int. Cl.³ .................. A01D 53/00; A47B 95/02
[52] U.S. Cl. .................. 16/111 A; 56/202; 56/DIG. 18; 280/47.37 R; 280/47.37 L
[58] Field of Search .................. 56/DIG. 18, 202; 280/47.37 R, 47.37 L, 47.37 C, 47.36; 16/111 A, 114 R, 111 R

[56] References Cited

U.S. PATENT DOCUMENTS

| | | | |
|---|---|---|---|
| 2,198,918 | 4/1940 | Mercil | 280/47.37 R |
| 2,348,741 | 5/1944 | Jessen | 280/47.37 R |
| 2,816,775 | 12/1957 | Costello | 280/47.37 R |
| 3,694,855 | 10/1972 | Meyer et al. | 280/47.37 R |
| 3,702,016 | 11/1972 | Keesiee | 16/111 A |
| 3,764,156 | 10/1973 | Nepper | 56/DIG. 18 |

FOREIGN PATENT DOCUMENTS 209888  1/1924  United Kingdom ............ 280/47.37 R Primary Examiner—Paul J. Hirsch
Attorney, Agent, or Firm—Erwin S. Teltscher

[57] ABSTRACT

An adaptor kit for use in a lawnmower, wherein the lawnmower has a frame, a pair of brackets secured to the frame, and a pair of handlebars, which may be releasably attached to the pair of brackets in a first position, and detached from the pair of brackets in a second position, and wherein the bag may be attached to the frame, and the attachment of the bag to the frame is facilitated upon the handlebars occupying the second position, includes first and second attachment devices which may be releasably secured to the handlebars, respectively, and a shifting device, which may be secured to the attachment device for shifting the handlebars from the first position to the second position, and vice versa, so that the bag may be easily attached to the frame, when the handlebars are in the second position.

8 Claims, 4 Drawing Figures

APPARATUS FOR FACILITATING ATTACHMENT OF A BAG TO A LAWNMOWER

BACKGROUND OF THE INVENTION

The attachment of a bag or grass catcher to the frame of some lawnmowers is facilitated, if the handlebars of the lawnmower are temporarily released from brackets or latches, in which they are normally received. Without the use of special tools, this is awkward to accomplish for a user.

SUMMARY OF THE INVENTION

It is accordingly an object of the present invention, to obviate these disadvantages, and to devise an apparatus, kit or method, whereby the handlebars of a lawnmower can be easily released from the brackets or latches, in which they are normally received, so that the bag or grass catcher can be attached to the lawnmower without any difficulty.

This object is achieved, according to the present invention, by providing an adaptor kit for use in a lawnmower, the lawnmower having a frame, a pair of brackets secured to the frame, and a pair of handlebars releasably attachable to the pair of brackets in a first position, and detachable from the pair of brackets in a second position, a bag being attachable to the frame, the attachment of the bag to the frame being facilitated upon the handlebars occupying the second position, wherein the adaptor kit includes first and second attachment means releasably securable to the handlebars, respectively, and shifting means securable to the attachment means for shifting the handlebars from the first position to the second position, and vice-versa, so that the bag may be easily attached to the frame when the handlebars are in the second position.

In one version of the present invention, the ends of the handlebars are relatively closely spaced from one another in the first position, and are further spaced from one another in the second position; in another version of the present invention, the ends of the handlebars are relatively closely spaced from one another in the second position, and are further spaced from one another in the first position.

It is advantageous if the first and second attachment means are first and second clamps securable to the handlebars, respectively, and first and second bars extending inwardly from the first and second clamps, respectively, so as to substantially overlap one another, and if the shifting means include a lever connected to the bars and normally occupying an initial position when the handlebars occupy the first position; the lever may be shifted to an operative position for moving the handlebars to the second position.

It is advantageous if at least one of the bars may be extended, so that the asssembled bars and lever may be fitted by means of the clamps to the pair of handlebars, when the handlebars occupy the first position.

In lieu of the provision of a kit, it is of course also possible to construct a lawnmower with the kit in place.

The method, according to the present invention, includes the steps of shifting the handlebars from the first position to the second position by the shifting means, so that the attachment of the bag to the frame is facilitated, and thereafter attaching the bag to the frame of the lawnmower; subsequently the handlebars are shifted to the second position by the shifting means. Depending on the construction of the lawnmower, the first shifting step may include the step of spreading the handlebars further apart from one another, and the second shifting step may include the step of shifting the handlebars closer to one another, or the first shifting step may include the step of shifting the handlebars closer to one another, and the second shifting step may include the step of spreading the handlebars further apart from one another.

BRIEF DESCRIPTION OF THE DRAWING

The invention will be better understood with the aid of the drawing, in which.

DESCRIPTION OF THE PREFERRED EMBODIMENTS

Figure 1:
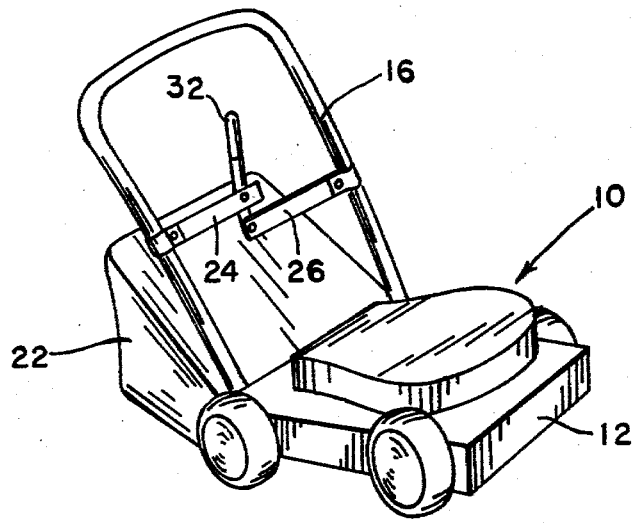
FIG. 1 shows a perspective view of the lawnmower, with the inventive kit in place.
Figure 2:
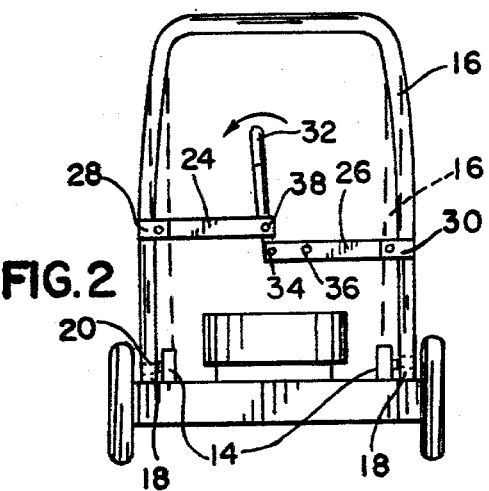
FIG. 2 shows one version of the kit for one type of lawnmower.
Figure 3:
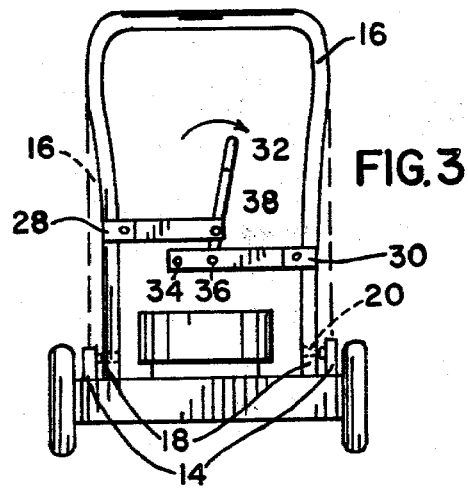
FIG. 3 shows a second version of the kit for another type of lawnmower.

Referring now to the drawing, there is shown a lawnmower 10 including a frame 12. A pair of brackets 14 is secured to the frame 12, and a pair of handlebars 16 are releasably attachable to the brackets 14 in a first position, and releasably detachable from the brackets 14 in a second position. The lawnmower 10 may be constructed so that the ends of the handlebars 16 are relatively closely spaced in the first position, when they are attached to the brackets 14, and are further spaced apart from one another, when they are released from the brackets 14, or they may be relatively closely spaced from one another in the second position, and further spaced apart in the first position. These two versions are shown in FIGS. 2 and 3, respectively, while FIG. 1 shows the handlebars 16 in an operative position, namely when they are attached to the brackets 14. It will be seen that the brackets 14 are generally provided each with a projecting stud 18, which fits into a corresponding hole or opening 20 of a corresponding handlebar, when the handlebars are in the first position, namely attached to the brackets 14. It will generally be desirable to attach a bag, or grass catcher 22 to the lawnmower. This may be accomplished in a variety of ways, for example by sliding non-illustrated hooks of a frame of the bag or grass catcher 22 over studs 18, or in any other acceptable manner, so that the bag or grass catcher 22 remains attached to the lawnmower 10, when the latter is operative, so that any grass cut is caught in a conventional manner in the bag or grass catcher 22.

If the examplary method of attachment of the bag or grass catcher 22 to the lawnmower 10 is used, it will be seen that the attachment of the bag or grass catcher 22 to the lawnmower 10 is facilitated, if the handlebars 16 are first spread apart, asshown in the embodiment of FIG. 2, or first shifted closer to one another, as shown in the embodiment of FIG. 3. But experience has shown that it is not easy to both spread the handlebars 16 apart (or shift them closer to one another) while simultaneously attempting to attach the bag 22 to the lawnmower. Upon attachment of the bag to the frame 12, the handlebars may be shifted closer to one another for the embodiment shown in FIG. 2, and spread apart, for the embodiment shown in FIG. 3.

In order to facilitate the attachment of the bag 22 to the lawnmower 10, there is provided, according to the present invention, first and second attachment means, for example, bars 24 and 26, each bar being fitted with corresponding clamps 28 and 30, which clamps are in turn securable to the pair of handlebars 16. There are further provided, according to the present invention, shifting means, for example a lever 32, which is journaled to the bars 24 and 26, so the handlebars 16 can be either further spread apart, or moved more closely to one another. The adaptor kit, which facilitates the attachment of the bag 22 to the lawnmower 10 can be used with either the version of the lawnmower shown in FIG. 2, or the version of the lawnmower shown in FIG. 3. It is only necessary to shift the connection of the lever 32 from an opening 34 to an opening 36 in the bar 26, an opening 38 remaining connected through a suitable pin or the like with the lever 32.

The bar 26 may include another bar 26', each bar being provided with a plurality of respective holes 40 and 40', which results in the bar 26—together with the auxiliary bar 26'—being extensible to fit various categories of lawnmowers, when appropriate holes 40 are juxtaposed with the appropriate holes 40' and the bars secured to one another by suitable attachment means, such as screws and threaded bolts, or the like.

It will be understood, of course, that that lawnmower 10 may be manufactured in the first place with the adaptor kit, according to the present invention, in which case it is no longer necessary to retrofit the adaptor kit to the lawnmower.

It will also be understood that the handlebars 16 may be in the U-shaped form shown in the drawing, or may be foldable, extensible, or the like.

It will be apparent that numerous variations and modifications can be made to the apparatus, according to the present invention, without the exercise of any inventive ingenuity, by one skilled in the art.

Figure 4:
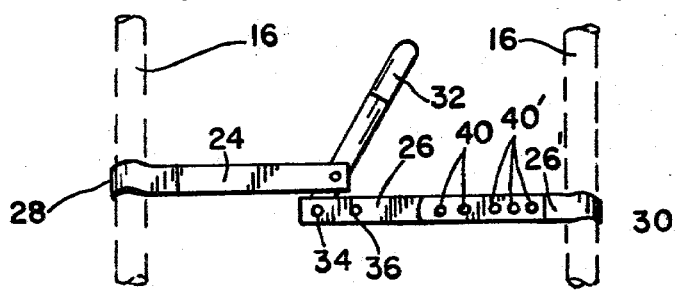
FIG. 4 shows a detail of the adaptor kit.

The extensible nature of the bar 26 is best seen in FIG. 4. The journaling of the lever 32 to the bars 24 and 26 may be accomplished by means of bolts and nuts, which do not restrain the lever 32 from being shifted from the first to the second position, and vice versa, or by other well-known means.

I claim:

1. An adaptor kit for use in a lawnmower, the lawnmower having a frame, a pair of brackets secured to the frame, and a pair of handlebars releasably attachable to said pair of brackets in a first position, and detachable from said pair of brackets in a second position,
   comprising in combination:
   first and second attachment means releasably securable to said handlebars, respectively, including first and second clamps securable to said handlebars, respectively, and first and second bars extending inwardly from said first and second clamps, respectively, so as to substantially overlap one another, and
   shifting means securable to said attachment means for shifting said handlebars between said first and second positions, including a lever connected to said bars and normally occupying an initial position, when said handlebars occupy said first position, said lever being shiftable to an operative position for moving said handlebars to said second position, whereby a bag is easily attachable to said frame when said handlebars are in said second position, and upon said bag being attached to said frame, said handlebars may be returned to said first position.

2. An adaptor kit as claimed in claim 1, wherein the ends of said handlebars are relatively closely spaced from one another in said first position, and are further spaced from one another in said second position.

3. An adaptor kit as claimed in claim 1, wherein the ends of said handlebars are relatively closely spaced from one another in said second position, and are further spaced apart from one another in said first position.

4. An adaptor kit as claimed in claim 1, wherein at least one of said bars is extensible, so that the assembled bars and lever may be fitted by means of said clamps to said pair of handlebars when said handlebars occupy said first position.

5. In a lawnmower having a frame, a pair of brackets secured to said frame, and a pair of handlebars releasably attachable to said pair of brackets in a first position, and detachable from said pair of brackets in a second position,
   the improvement comprising:
   first and second attachment means releasably securable to said handlebars, respectively, including first and second clamps securable to said handlebars, respectively, and first and second bars extending inwardly from said first and second clamps, respectively, so to substantially overlap one another, and
   shifting means securable to said attachment means for shifting said handlebars between said first and second positions, including a lever connected to said bars and normally occupying an initial position, when said handlebars occupy said first position, said lever being shiftable to an operative position, whereby a bag is easily attachable to said frame when said handlebars are in said second position, and upon said bag being attached to said frame, said handlebars may be returned to said first position.

6. In a lawnmower as claimed in claim 5, wherein the ends of said handlebars are relatively closely spaced from one another in said first position, and are further spaced from one another in said second position.

7. In a lawnmower as claimed in claim 5, wherein the ends of said handlebars are relatively closedly spaced from one another in said second position, and are further spaced apart from one another in said first position.

8. In a lawnmower as claimed in claim 5, wherein at least one of said bars is extensible, so that the assembled bars and lever may be fitted by means of said clamps to said pair of handlebars when said handlebars occupy said first position.

* * * * *